United States Patent
Blumenschein et al.

(10) Patent No.: US 7,599,912 B2
(45) Date of Patent: Oct. 6, 2009

(54) STRUCTURED QUERY LANGUAGE (SQL) QUERY VIA COMMON OBJECT REQUEST BROKER ARCHITECTURE (CORBA) INTERFACE

(75) Inventors: Gordon Blumenschein, Woodridge, IL (US); Peter Neuwald, Milwaukee, WI (US); William Trost, Mequon, WI (US); Scott R. Watry, Greenfield, WI (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1236 days.

(21) Appl. No.: 10/341,520

(22) Filed: Jan. 14, 2003

(65) Prior Publication Data

US 2004/0139197 A1 Jul. 15, 2004

(51) Int. Cl.
*G06F 7/00* (2006.01)
*G06F 17/30* (2006.01)
(52) U.S. Cl. .................................. 707/3; 707/6; 707/10
(58) Field of Classification Search ............... 707/1–10, 707/100–104.1, 200–206; 709/217, 219, 709/203–210; 718/103, 104; 719/330
See application file for complete search history.

(56) References Cited

U.S. PATENT DOCUMENTS

| | | | |
|---|---|---|---|
| 5,737,515 A | 4/1998 | Matena | |
| 6,122,627 A | 9/2000 | Carey et al. | |
| 6,199,195 B1* | 3/2001 | Goodwin et al. | 717/104 |
| 6,209,018 B1 | 3/2001 | Ben-Schachar et al. | |
| 6,272,213 B1 | 8/2001 | Nightingale | |
| 6,304,967 B1 | 10/2001 | Braddy | |
| 6,330,598 B1 | 12/2001 | Beckwith et al. | |
| 6,356,955 B1 | 3/2002 | Hollberg et al. | |
| 6,446,225 B1 | 9/2002 | Robsman et al. | |
| 6,542,920 B1* | 4/2003 | Belkin et al. | 718/104 |
| 2001/0010053 A1 | 7/2001 | Ben-Schachar et al. | |
| 2002/0035626 A1 | 3/2002 | Higuchi | |
| 2002/0083078 A1 | 6/2002 | Pardon et al. | |
| 2002/0104067 A1 | 8/2002 | Green et al. | |
| 2002/0129030 A1* | 9/2002 | Kim et al. | 707/100 |
| 2003/0046395 A1* | 3/2003 | Fleming et al. | 709/226 |

FOREIGN PATENT DOCUMENTS

JP 2000-45445 9/2000

OTHER PUBLICATIONS

Koschel et al., Configurable event triggered services for CORBA-based systems, IEEE, Nov. 3-5, 1998, 306-318.*
Tran et al., Analyzing the scalability of transactional CORBA applications, IEEE, Mar. 12-14, 2001, 102-110.*
An Abstract of an IBM Technical Disclosure Bulletin dated Dec. 1996, vol. 39, publication No. 12, pp. 179-180, entitled "Object Request Broker Timeout Capability", Dec. 1996, pp. 179-180.

(Continued)

*Primary Examiner*—Jean B Fleurantin
(74) *Attorney, Agent, or Firm*—Greenblum & Bernstein P.L.C.

(57) ABSTRACT

An method and apparatus for efficiently querying a service manager are provided. The method includes running a thread that includes a common object request broker architecture (CORBA) request. The request includes a structured query language string. The request, including the structured query language string, is forwarded to the service manager.

16 Claims, 5 Drawing Sheets

OTHER PUBLICATIONS

An Abstract of an IBM Technical Disclosure Bulletin dated May 1995, vol. 38, publication No. 5, pp. 419-420, entitled "Reducing the Latency of Distributed Resource Registration", May 1995, pp. 419-420.

A screen-shot of a website entitled "Aglets Specification (1.0)", from <http://www.trl.ibm.com/aglets/spec10.htm>, downloaded no later than Oct. 1, 2002, pp. 1-31.

A screen-shot of a website entitled "The Simple Interface/The Expert Interface/Starting jFPSCI", from <http://www.fnpcc.final.gov/docs/monitorhelp.html>, downloaded no later than Oct. 1, 2002, pp. 1-4.

A screen-shot of a website entitled "Java BluePrints", from <http://www.java.sun.com/blueprints/patterns/j233_patterns/page_by_page_iterator/index.html, downloaded no later than Apr. 14, 2003, pp. 1-2.

* cited by examiner

STRUCTURED QUERY LANGUAGE (SQL) QUERY VIA COMMON OBJECT REQUEST BROKER ARCHITECTURE (CORBA) INTERFACE

BACKGROUND OF THE INVENTION

1. Field of the Invention

The present invention relates to computer networks. More particularly, the present invention relates to performing a call to a service manager via a common object request broker architecture (CORBA) interface.

2. Background Information

A client connected to a computer network may request a service manager (SM) to retrieve information from at least one storage device that is managed by the service manager. For example, a client of a telecommunications service provider may retrieve customer data from, or forward a service request to, a storage device via calls to a service manager. The client may be, for example, a networked computer used by a provisioning employee of the telecommunications service provider.

Additionally, a networked customer may call a service manager using, for example, a personal computer connected to the Internet. Alternatively, a customer of a telecommunications service provider may call a designated number using the public switched telephone network (PSTN) or an advanced intelligent network (AIN). The customer interacts with an intelligent peripheral (IP) or service node/intelligent peripheral (SN/IP) with interactive voice response functionality. In the case of a customer using the PSTN or AIN, the computer network client may be a proxy client for the customer in submitting a data signal request to a service manager over a computer network.

A problem is known to occur when a request is made by a client to a service manager using a common object request broker architecture (CORBA) interface. Currently, a client running a thread, for example a Java thread, that forwards a request to a service manager may only have a limited number of threads available. For any number of reasons, a response to a request may be returned very slowly or not at all. For example, a service manager may need to search a large number of storage devices with a large amount of stored data, or the service manager may need to return a large amount of data in response to a request from a client. Additionally, an error may occur at the service manager while the client continues to run the thread and wait for a response to the request. Since a Java thread on the client is not freed until a response is returned from the service manager the client may lose a limited resource (i.e., the thread) indefinitely.

When a client waits indefinitely for a response to a request from a Java thread, the provisioning or customer access system (client) is left with only the remaining Java threads to perform queries. As a result, even if only a small percentage of requests do not generate a prompt response from the service manager, the client can eventually run out of Java threads and be unable to perform further queries.

Additionally, a problem is known to occur when a client is unable to make a query language call, for example a general structured query language (SQL) call (request), via a common object request broker architecture (CORBA) interface to a service manager. For example, a telecommunications service provider client is unable to make a SQL call via a Lucent enhanced service manager (eSM) common object request broker architecture interface. If a client had the ability to pass a SQL string to a service manager via a common object request broker architecture request, a client could instruct the service manager to iteratively return data and thereby minimize a period of time spent waiting for a response from the service manager.

To avoid the problems set forth above, a computer network apparatus and method are needed to more efficiently forward a request via a CORBA interface while minimizing interference with other client requests. For example, a need exists for timing the length of a CORBA request made by a client and ending the thread that initiated the request when the length of time waiting for a response is greater than a preset amount. Additionally, a need exists for iteratively returning information in response to a CORBA request so as to improve the efficiency of a computer network. Furthermore, an ability to pass a SQL string to a service manager via a CORBA request is needed to ensure a client either receives a prompt response from a service manager or ends the thread making the request.

BRIEF DESCRIPTION OF THE DRAWINGS

The present invention is further described in the detailed description that follows, by reference to the noted drawings by way of non-limiting examples of embodiments of the present invention, in which like reference numerals represent similar parts throughout several views of the drawing, and in which.

DETAILED DESCRIPTION OF THE INVENTION

Figure 1:
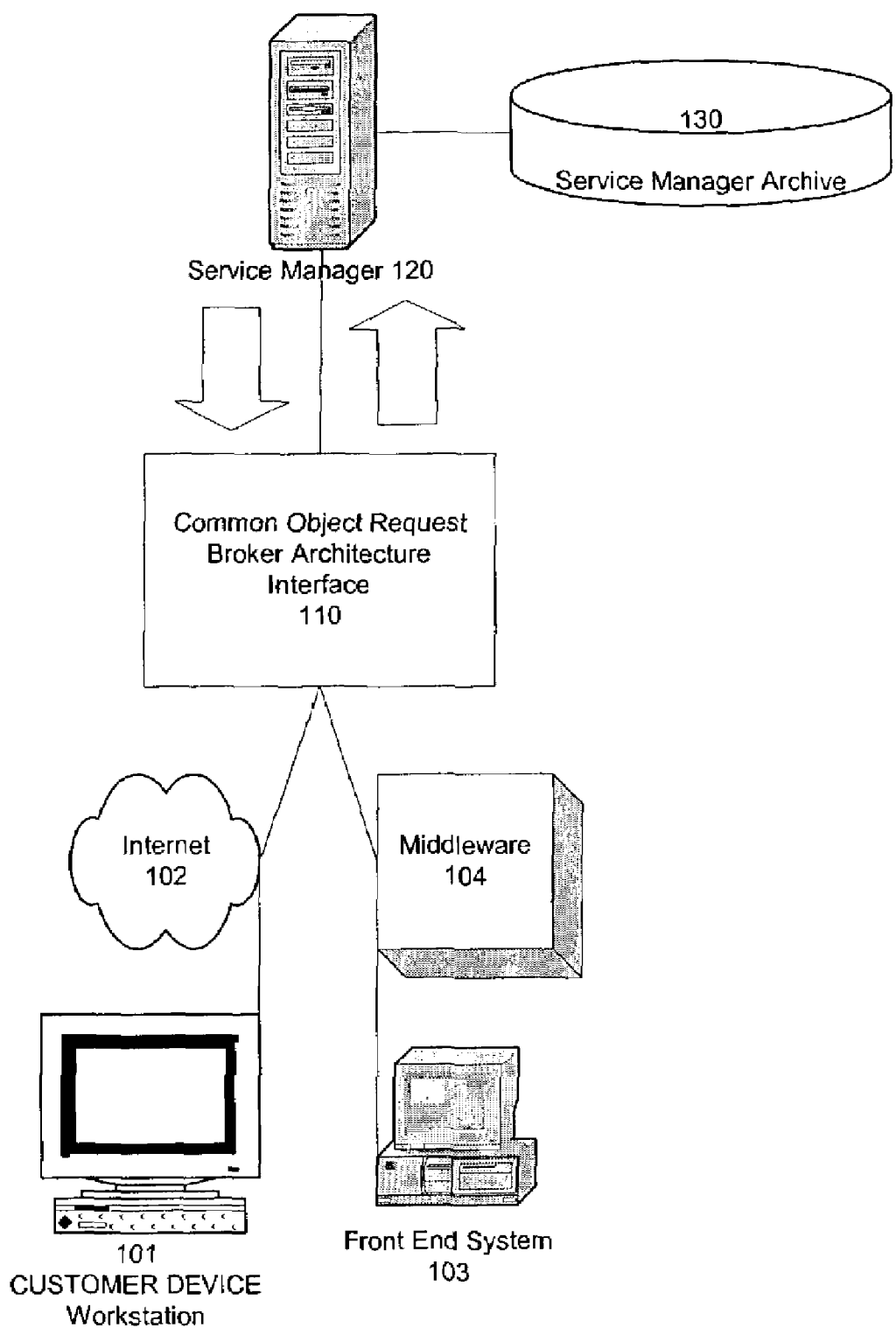
FIG. 1 shows an exemplary computer network architecture, according to an aspect of the present invention.

In view of the foregoing, the present invention, through one or more of its various aspects, embodiments and/or specific features or sub-components, is thus intended to bring out one or more of the advantages as specifically noted below.

According to an aspect of the present invention, a method of querying a service manager is provided. The method includes running a thread that includes a common object request broker architecture (CORBA) request that includes a structured query language (SQL) string. The method also includes forwarding the request to the service manager.

According to another aspect of the present invention, the method includes iteratively receiving information that matches at least one parameter of the SQL string.

According to still another aspect of the present invention, the method includes caching information that matches the at least one parameter of said SQL string at the service manager. The method also includes iteratively forwarding the cached information.

According to yet another aspect of the present invention, a size of the information that is received at each iteration is specified by the SQL string.

According to another aspect of the present invention, the method includes waiting for a response from the service manager for a predetermined period of time after the request is forwarded. The method also includes stopping the waiting when no response is received from the service manager during the predetermined period of time.

According to still another aspect of the present invention, the thread includes a timeout module that waits for a response from the service manager for a predetermined period of time after the request is forwarded. The timeout module stops the waiting when no response is received from the service manager during the predetermined period of time.

According to yet another aspect of the present invention, the method includes monitoring a time waiting for a response from the service manager. When the time waiting for the response reaches a predetermined threshold, the method includes stopping the thread and no longer waiting for the response.

According to another aspect of the present invention, the service manager is a network element that manages a plurality of services on a network.

According to still another aspect of the present invention, the information that matches the at least one parameter is received via the service manager from a database associated with a service control point in a telecommunications network.

According to an aspect of the present invention, an apparatus is provided for querying a service manager in a telecommunications network. The apparatus includes a processor that runs a thread that includes a common object request broker architecture (CORBA) request. The CORBA request includes a structured query language (SQL) string. The apparatus also includes a memory that stores an operating system for the apparatus. The apparatus forwards the request to the service manager.

According to another aspect of the present invention, the apparatus iteratively receives information that matches at least one parameter of the SQL string.

According to still another aspect of the present invention, the information that matches the at least one parameter of the SQL string is received via the service manager from a database associated with a service control point in the telecommunications network.

According to yet another aspect of the present invention, the apparatus monitors a time waiting for a response from the service manager. When the time waiting for a response reaches a predetermined threshold, the apparatus stops the thread and no longer waits for a response.

According to another aspect of the present invention, information matching a parameter set of the SQL string is cached at the service manager.

According to still another aspect of the present invention, a size of the information that is received at each iteration is specified by the SQL string.

According to yet another aspect of the present invention, the apparatus waits for a response from the service manager for a predetermined period of time after the CORBA request is forwarded. The waiting by the apparatus is stopped when no response is received from the service manager during the predetermined period of time.

According to another aspect of the present invention, the thread includes a timeout module that waits for a response from the service manager for a predetermined period of time after the request is forwarded. The timeout module stops the waiting when no response is received from the service manager during the predetermined period of time.

According to still another aspect of the present invention, the service manager includes a network element that manages multiple services on the telecommunications network.

According to an aspect of the present invention, a system for querying a service manager in a telecommunications network is provided. The system includes a client that runs a thread that includes a common object request broker architecture (CORBA) request that includes a structured query language (SQL) string. The system also includes a service manager that receives the request from the client.

According to an aspect of the present invention, a computer readable medium is provided for storing a computer program that queries a service manager. The computer readable medium includes a thread running source code segment that runs a thread that includes a common object request broker architecture (CORBA) request that includes a structured query language (SQL) string. The computer readable medium also includes a request forwarding source code segment that forwards the request to the service manager.

According to another aspect of the present invention, the computer readable medium includes an information receiving source code segment that iteratively receives information that matches at least one parameter of the SQL string.

According to still another aspect of the present invention, the computer readable medium also includes a response waiting source code segment that waits for a response from the service manager for a predetermined period of time. The computer readable medium also includes a wait stopping source code segment that stops the waiting when no response is received from the service manager during the predetermined period of time.

A computer network architecture is provided in which clients can access a service manager and in which the service manager accepts requests from clients. A client may request to retrieve client data from a storage device managed by the service manager. The client may also request to initiate, authorize, terminate or otherwise enable a change in a service by instructing the service manager to program a storage device managed by the service manager to reflect the change in the service. The storage device may be, for example, a database or other memory device associated with a server, either internally or externally.

The client communicates via the computer network with the service manager. The client may be a proxy client that serves as a proxy for a communications device that does not support communications on the computer network. In other words, the proxy may serve as an intermediary between the communications device and the service manager. For example, a client server may be provided for a particular application service or multiple application services to handle client connections. The client server communicates with a service manager to obtain data on behalf of customers and also to submit service personnel and customer orders. In one embodiment the service manager include a service manager server and a service manager database.

The client server or service manager server includes a processing unit and a memory subsystem. A server's memory subsystem normally includes volatile memory (e.g., RAM) and non-volatile memory (e.g., ROM, hard disk drive, CD-ROM). The memory may include an operating system and a session manager. The operating system is stored in the memory and executed on the processing unit. The client server or service manager server may be implemented, for example, with a UNIX-based mainframe or computer.

The client may use an application that allows access to a data service that runs on a service manager. The service may need to be available to multiple clients simultaneously. The service framework may be implemented with a CORBA interface.

To access the service, the client may obtain an object reference to a particular service object for the service on which the client intends to execute an operation (request). The client may utilize a service locator that maintains the name space of service objects on the service manager in a distributed object computer network system where multiple services are provided simultaneously. A service locator may be provided at the client or at the service manager. A service on the service manager may be associated with an address to a service object. Additionally, the service locator may associate the service with a set of properties for the service. Accordingly, a service locator may include a registry of services along with the location of each particular service in the distributed object computer network system.

The service locator, the service manager, and the service objects may all represent CORBA objects that export a CORBA interface in the form of an interface definition language (IDL) interface. The service manager, the service object and the service locator may be implemented in a programming language, such as JAVA.

A telecommunications service provider may utilize the computer network and service manager. For example, a customer using the public switched telephone network (PSTN) may dial a predetermined local terminating number to contact a service node/intelligent peripheral (SN/IP), e.g., an interactive voice response (IVR) platform or interactive voice response (IVR) unit. The service node/intelligent peripheral collects information from the customer and runs a thread that forwards a CORBA request to a service manager. The CORBA request to the service manager includes an SQL string. Accordingly, the service node/intelligent peripheral may forward a CORBA request that includes SQL instructions to the service manager regarding the retrieval of data.

Additionally, a customer using an advanced intelligent network (AIN) system may dial a predetermined number, e.g., 3 digit or 800 number, to contact an intelligent peripheral (IP). Advanced intelligent network systems are presently employed by telecommunications companies to implement and provide advanced subscription-based telephony services and features to customers. Advanced subscription-based services may include, e.g., voicemail, selective call acceptance, or advanced call routing to customer-defined destinations.

The AIN architecture generally comprises two networks, a data messaging network and a trunked communications network. An advanced intelligent network system includes a switching network for trunked communications with end offices called service switching points (SSPs). Additionally, data messages are sent from the service switching points to service control points (SCPs) along a common channel signaling (CCS) network. The switching network may also include signal transfer points (STPs) that are used to facilitate communications between the service switching points and the service control points.

A customer initiates a call that is routed to the service switching point. The service switching point identifies a predefined "trigger" and generates a data query requesting information to process the call. The query is routed to the service control point after intermediate processing by a service transfer point. The service control point addresses an associated database and replies to the processed query according to the customer's predefined service agreements.

The service control points execute software or programmed-based logic, in accordance with a customer's call processing record (CPR), and returns call routing instructions to a service switching point. The call processing records define the services for each individual customer.

For additional information regarding AIN and AIN-related network environments, see Berman, Roger K., and Brewster, John H., "Perspectives on the AIN architecture," IEEE Communications Magazine, February 1992, pp 27-32, the disclosure of which is expressly incorporated herein by reference in its entirety.

Multiple service control points from a single vendor may be managed by a service manager provided by the vendor. Customers and users do not access a service control point directly because direct access would interfere with call processing. The service manager may be, for example, a service management system (SMS) or an enhanced service manager (eSM). Because different service managers may operate according to different protocols, a telecommunications service provider may replace the service managers of the various vendor with a single customized type of service manager for uniformity.

Additionally, a global service management system may be provided to communicate with each of the various vendor service managers in order to preserve the functionality of the different service managers provided by multiple vendors. A global service management system for managing service managers in an advanced intelligent network is disclosed at, for example, U.S. Pat. No. 6,330,598 to BECKWITH et al., issued Dec. 11, 2001, and entitled "Global Service Management System for an Advanced Intelligent Network", the disclosure of which is expressly incorporated by reference herein in its entirety.

Telecommunications service provider clients may be, for example, networked computers used by employees of the telecommunications service provider. A client may connect to a service manager server over a local area network (LAN) using transmission control protocol/internet protocol (TCP/IP) and messaging middleware such as the global order interface (GOI). The global order interface is a flow-through provisioning system. Additionally, a service order administration and control (SOAC) system may receive service order activity from service personnel and forward the service orders to a service manager. The service order administration and control system is an automated provisioning system used to compile and forward update equests to a service manager.

A service creation environment (SCE) such as a service provision and creation environment (SPACE) may also be used to provision a service control point. The service creation environment (SCE) may be provided for programming and provisioning a call processing record in a database of a service control point. For example, a service manager server may send information to, and receive information from, a service control point via a service creation environment such as SPACE. The service manager server may be provided with a database for storing a copy of service data that is stored in a service control point.

The service manager may be reserved by a client. A reservation request may include a priority given to the client. For example, equipment used by an employee or agent of a telecommunications service provider may have a higher priority than equipment used by customers of the telecommunications service provider. A reservation request may also include a requested reservation time, a duration, a client access mode and a wait mode. A client access mode may distinguish between a client that will perform a write access (update) and a client that will perform a read access (review). A wait mode may distinguish between whether a client is willing to wait if the service manager is not available and, e.g., a maximum wait time the client is willing to wait for the service manager to become available.

A variety of timeouts may be provided to the service manager. For example, the service manager may include a reservation timeout that allows the service manager to terminate a reservation once the reservation period expires. Additionally, an inactive timeout may be provided to the service manager when an idle client is detected. For example, if the service manager does not receive a query or other communication from a client in a specified time, the service manager may revoke a reservation.

When the service manager includes a server, the session manager of the server may be provided with a timeout clock. The timeout clock in a session manager may be separate from a system clock, though the system clock may be used to initially derive time increments. The timeout clock in a session manager counts each time increment after the timeout clock is started. Since the timeout clock is a part of the server, the timeout clock may measure time units after the server is started.

FIG. 1 shows an exemplary computer network architecture of the present invention. As shown, customer device 101 may be, e.g., a workstation connected to the internet 102. The internet 102 interfaces with the CORBA interface 110 in order to communicate with the service manager 120. For example, the internet may include an internet server (not shown) that interfaces with the customer and the CORBA interface 110. The service manager 120 may be associated with a service manager archive 130. In the case of a customer device 101 that interacts with the service manager 120, the customer device 101 may serve as the computer network client of the present invention.

Additionally, a front end system 103 may be connected to middleware 104. Middleware 104 interfaces with the CORBA interface 110 in order to communicate with the service manager 120. In the case of a front end system 103 that interacts with the service manager 120, the front end system 103 may serve as the computer network client of the present invention.

In an embodiment, the middleware 104 may be a Global Order Interface (GOI) that is used by a front end system 103 of a telecommunications service provider. For example, an employee or agent of a telecommunications service provider may logon to the front end system 103 using, e.g., a graphical user interface (GUI), to start a provisioning system for adjusting service for customers of the telecommunications service provider. The Global Order Interface is a flow-through system that allows the provisioning instructions from the front end system 103 to flow through to the CORBA interface 110.

In the embodiment of FIG. 1, a customer or telecommunications service provider employee can interact with the service manager 120 via the CORBA interface 110. According to the present invention, the customer or telecommunications service provider employee can submit a request to view or update service data of a service manager archive 130 managed by the service manager.

The client 101 or 103 interacting with the service manager 120 will begin running a thread that encompasses a CORBA request to the service manager 120. When the request is forwarded to the service manager 120, the client 101 or 103 may initiate a timeout clock that will stop the thread if a response to the request is not received from the service manager 120 in a predetermined time period.

Additionally, the request can include a query language string, for example a structured query language (SQL) string, used by the service manager 120 to search the service data of the service manager archive 130. The query language string can, for example, instruct the service manager 120 to iteratively return data of the service manager archive 130 even though a complete data set responsive to the request has not yet been found by the service manager 120. Accordingly, an initial response to the request may be returned before a timeout clock stops the thread. The instruction from the client 101 or 103 to iteratively return data may include a parameter for the size of the data set to be returned. The size of the data set may be a configurable subset of the data. A configurable subset of the data to be returned is referred to as a "Page-by-Page Iterator Design Pattern". The service manager 120 caches the data locally and initiates a method call to iteratively retrieve the data in configurable subsets, where the size of the configurable subset is specified in the method call initiated by the service manager 120.

The request may be a request to view service data of a customer. For example, a customer of a telecommunications service provider may request to view all services activated for a customer account. Additionally, the request may be a request to update services of the customer. For example, the customer of the telecommunications service provider may request to change destination data in a call-routing service. The service manager archive 130 that is searched by the service manager 120 may be associated with a service control point (not shown) managed by the service manager 120. Accordingly, if the customer requests to update services of the customer's account, the service manager 120 may forward data to be stored at the service control point. The service control point will then provide services for the customer according to the updated account information.

Of course, the query language call that is submitted from the client 101 or 103 to the service manager 120 via the CORBA interface 110 may be used to perform a variety of tasks in addition to the tasks described herein. In particular, the query language call that is passed through the CORBA interface 110 may be used to pass any instruction to the service manager 120 in relation to activities for interacting with the service manager archive 130.

Figure 2A:
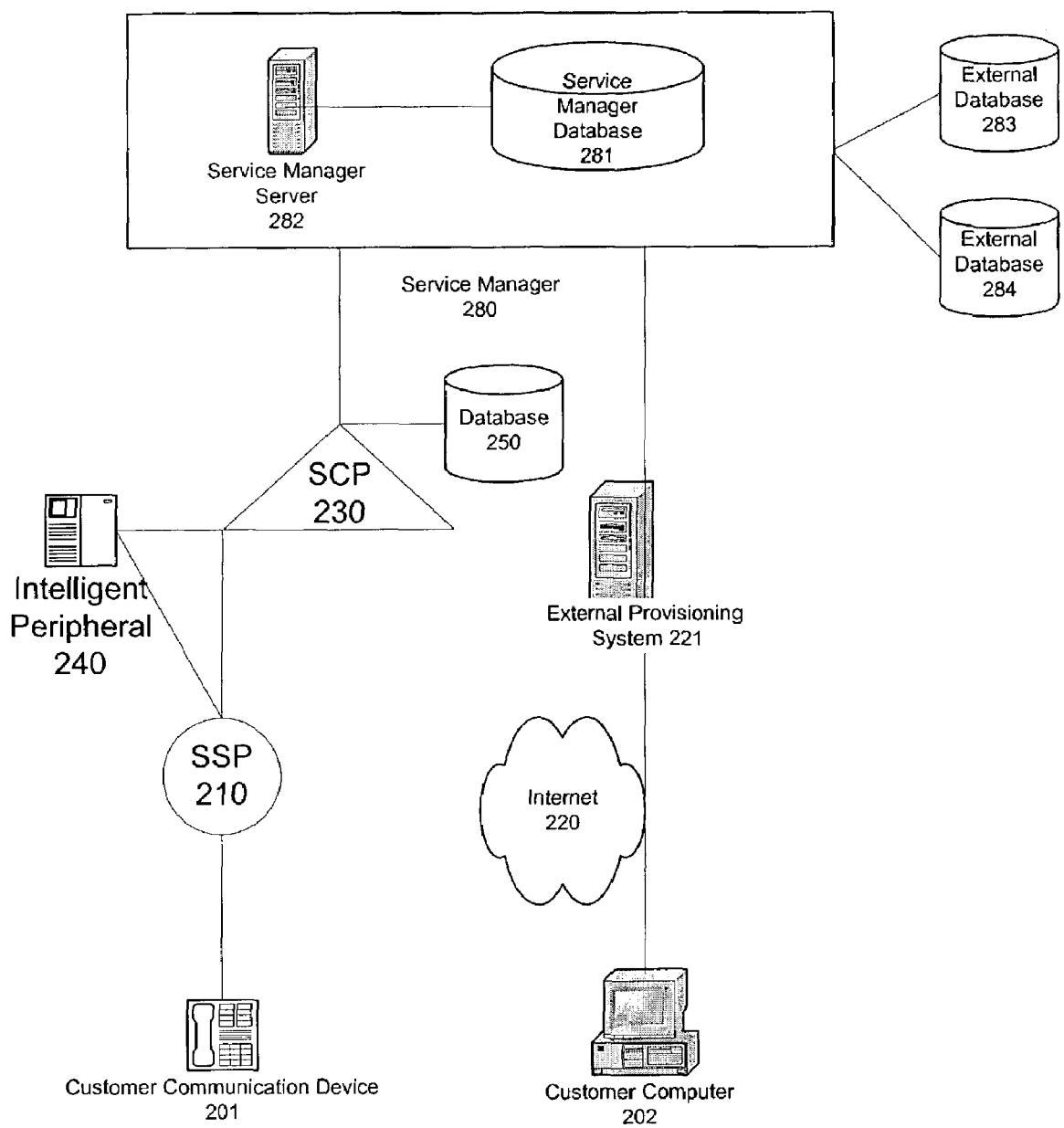
FIG. 2A shows an exemplary telecommunications computer network architecture that includes an intelligent peripheral, according to an aspect of the present invention.

FIG. 2A shows an exemplary telecommunications network architecture for the present invention. In the embodiment shown in FIG. 2A, a customer communications device 201 goes off hook and dials a predetermined number to access a service provisioning service provided by a communications service provider. The communications device 201 is connected to the service switching point 210.

The service provisioning service includes an intelligent peripheral 240 that corresponds to the predetermined number dialed by the customer. The predetermined number may be a local destination number terminating at the intelligent peripheral. When the service switching point 210 routes the call to the intelligent peripheral 240, the intelligent peripheral 240 obtains instructions from the service control point 230 to, e.g., play an introductory message to the customer. The intelligent peripheral 240 interacts with the customer at the direction of the service control point.

The predetermined number used to access the service provisioning service may also include a predefined "trigger" to invoke advanced intelligent network call routing. If the service switching point 210 identifies a predefined "trigger" in the predetermined number, the service switching point 210 suspends the call, and generates a data query to request information to process the call. The query is routed to the service control point 230 after intermediate processing by a service transfer point (not shown). Exemplary service control points 130 include the Telcordia Integrated Service Control Point Current Generation Platform (SCP)(CGP); the ISCP Next Generation Platform (NGP); or the Lucent Advantage Service Integrated Service Control Point (ISCP), loaded with ISCP software, available from Telcordia, Murray Hill, N.J.

In response to the query, the service control point 230 executes internal logic for the service provisioning service. The service control point 230 may address an associated database 250 to obtain a routing telephone number and replies to the processed query according to the customer's predefined service agreements.

The service control point 230 returns a routing telephone number for an intelligent peripheral 240 to the service switching point 210. The service switching point 210 routes the call to the intelligent peripheral 240 through the switching network. The service control point 230 also instructs the intelligent peripheral 240 to play an introductory message to the customer. The introductory message may include a request for the customer to input digits to identify a purpose for the call. The intelligent peripheral 240 interacts with the customer and the service control point 230. The customer responds to a series of predefined inquiries from the intelligent peripheral 240 by, for example, speaking or pressing digits on the phone.

Intelligent peripherals with interactive voice response functionality typically interact with a customer by receiving standard dual tone multi-frequency (DTMF) signals from the customer's communications device and providing audible instructions and other messages to the customer. In the alternative, an intelligent peripheral 240 may be provided with speech recognition functionality, such as Nuance speech recognition software, available from Nuance Communications of Menlo Park, Calif., in addition to interactive voice response functionality. The speech recognition software may receive and interpret voice input from the customer. Accordingly, the intelligent peripheral 240 may receive and interpret voice input from the customer and/or touch tone DTMF signals, as long as the intelligent peripheral 240 has an interactive voice response capability and speech recognition software. Of course, any comparable speech recognition system may likewise be incorporated into the system.

If the customer responds to inquiries from the intelligent peripheral 240 by pressing digits on the phone, the intelligent peripheral 240 receives the numbers and translates DTMF tones of the entered numerals into data. A data message with the numbers is forwarded to the service control point 230, which determines the proper service manager service the caller wishes to access. The service control point 230 serves as a client for the customer in the computer network that includes the service manager 280.

Service manager 280 is provided with a CORBA interface (not shown) that interfaces with the service control point 230. In particular, the service control point 230 serves as the "client" by running a thread encompassing a CORBA request that is forwarded to the service manager 280. Additionally, the thread running at the service control point 230 may include a timeout module that stops the thread if a response is not received from the service manager 280 in a predetermined period of time.

Service manager 280 may include a service manager server 282 and a service manager database 281. The service manager database may store copies of client requests. For example, if a client requests to initiate a service update at a future date, the service manager database 281 may store the request until the future date set by the client. The service manager server 282 is used to process requests from a client. The service manager server 282 may also be used to create and forward query language strings, for example structured query language (SQL) strings, to databases, either external or internal. For example, the service manager server 282 may forward a request for information regarding an update status of a previously requested update to the service manager database 281. Additionally, the service manager server 282 may forward an SQL query to retrieve service information stored in external database 283 or 284. The external databases 283 and 284 may each be associated with a particular service, or may each be associated with a particular service control point (not shown) that is used to execute software or programmed-based logic in accordance with a customer's call processing record.

The information received from the customer may also be used to create the SQL string that is included in the CORBA request. The SQL string may include information related to the customer information. The SQL string may also include processing instructions to ensure that the request will receive a prompt response from the service manager. For example, the SQL string may instruct the service manager 280 to begin iteratively forwarding data collected in response to the request, although the data set is not complete. Accordingly, a response to the request may be forwarded by the service manager 280 before a timeout period expires.

Additionally, the request may include an instruction to cache remaining collected data at the service manager 280 until the next iteration is to be iteratively forwarded to the intelligent peripheral 240. The request may include an instruction determining the size of the subset of information that is received. The thread running on the client may also include a timeout module that ends or restarts the thread if no response is received from the service manager in a predetermined time period relating to, for example, requirements of the telecommunications service provider. Additionally, the client may require that the total duration of a request not exceed a predetermined period of time. For example, the telecommunications service provider may require that a request made via a CORBA interface not exceed 500 milliseconds more than an equivalent call made according to an alternative method.

Accordingly, the thread from the service control point 230 (client) will either receive a prompt response from the service manager 280, or the client will stop or restart the request. If the request is stopped entirely, a request for another customer may be forwarded by the service control point 230 or another service control point (not shown).

FIG. 2A also shows a customer computer 202 that is connected to the internet 220. An external provisioning system 221 provided for the customer computer 202 serves as a client. The customer computer 202 is used to provide information and make requests to the service manager 280. In the embodiment of FIG. 2A, the external provisioning system 221 serves as a "client" by running a thread encompassing a CORBA request that is forwarded to the service manager 280. The information received from the customer is used to create the SQL string at the external provisioning system that is included in the CORBA request. The SQL string includes information related to the customer information, as well as processing instructions related to ensuring that the request is responded to efficiently by the service manager 280.

Accordingly, the thread running on the external provisioning system 221 is similar to the thread running on the service control point 230. The thread from the external provisioning system 221 (client) will either receive a prompt response from the service manager 280, or the client will stop and/or restart the thread. If the thread is stopped entirely, a request for another customer may be forwarded by the external provisioning system 221.

In the embodiment of FIG. 2A, the service manager 280 is used to program service control points with customer service information related to, for example, advanced intelligent network services. Accordingly, if the customer using the customer communications device 201 wishes to initiate or change a service with the service manager 280, the information provided by the customer to intelligent peripheral 240 is forwarded from the service control point 230 to the service manager 280. The service manager 280 will program a service control point 230 and/or database 250, or external database 283 or 284 which are associated with additional service control points (not shown), with instructions to carry out the service request of the customer. Of course, as was noted above, the service manager 280 may be used to program services in multiple service control points (not shown). The service manager 280 may be used to program or retrieve data from, for example, external databases 283 or 284 which are associated with an additional service control point(s) (not shown). Accordingly, the telecommunications service provider using the apparatus and method of the present invention is provided with the ability to allow customers and employees to retrieve data from, or program, a storage apparatus that stores, for example, the call processing record of a customer.

The customer using customer computer 202 that initiates or changes services with the service manager 280 will be able to access the service manager 280 in order to review and change services. With the SQL string included in the CORBA request, a client such as the external provisioning system 221 will be better able to process service management requests for many users without losing for extended periods of time the use of threads running on the client.

Figure 2B:
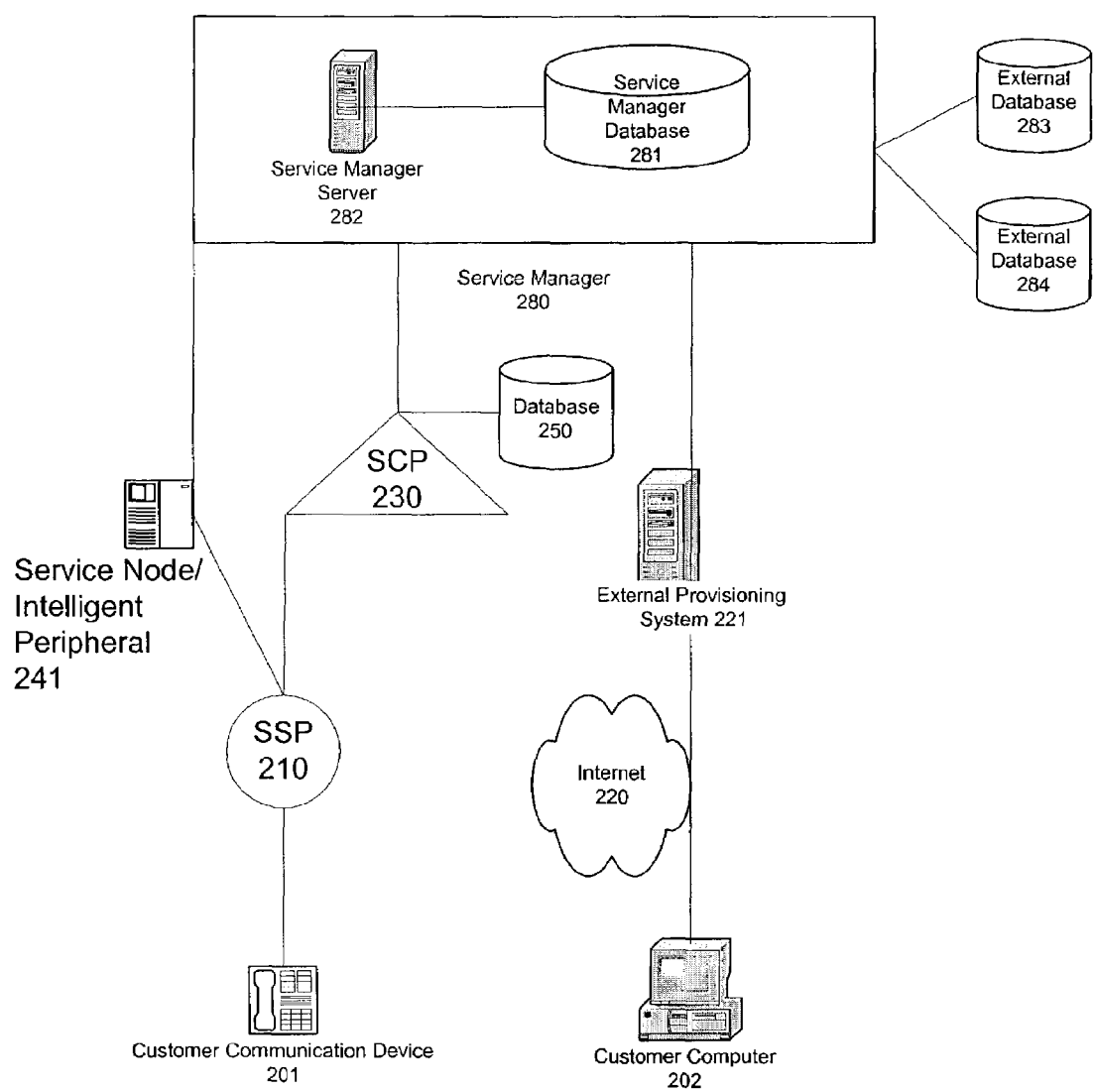
FIG. 2B shows another exemplary telecommunications computer network architecture that includes a service node/intelligent peripheral, according to an aspect of the present invention.

FIG. 2B shows a service node/intelligent peripheral (SN/IP) 241 in place of the intelligent peripheral 240. The service node/intelligent peripheral 241 may differ from the intelligent peripheral 240 by a capability to operate independently of the service control point 230 in many aspects. Accordingly, the service provisioning service may be accessed and used without being directly connected to the service control point 230. For example, the service node/intelligent peripheral 241 may include an independently operating interactive voice response platform that does not require instructions from the service control point 230 in order to interact with the customer. The service node/intelligent peripheral 241 can be a computer or communications server linked to the service switching point 210 via, for example, an ISDN link using either ISDN-BRI (Basic Rate Interface) or an ISDN-PRI (Primary Rate Interface) protocol, each of which is known in the art.

The SN/IP 241 contains resources to offer service enhancements to customers of a telecommunications service provider. The SN/IP 241 may combine computer telephony integration (CTI) and advanced speech technologies in a single platform used as a system resource. The SN/IP 241 may provide speech recognition, text-to-speech/speech-to-text conversion and dual-tone multi-frequency (DTMF) recognition with external telephony resources.

The service node/intelligent peripheral 241 is connected to the service switching point 210, similar to the manner in which intelligent peripheral 240 is connected to service switching point 210. However, as noted above, once the call is received at the service node/intelligent peripheral 241, the service node/intelligent peripheral 241 is less dependent on the service control point 230 than is the intelligent peripheral 240. In particular, the service node/intelligent peripheral 241 performs processing functions and determines actions to take, such as playing a prerecorded message to a customer, without direction from the service control point 230.

Accordingly, in an embodiment, the service node/intelligent peripheral 241 may serve as the client in the computer network that includes the service manager 280. The SN/IP 241 runs a thread so that a CORBA request is forwarded to the service manager 280. The CORBA request may include an SQL string. Accordingly, the service node/intelligent peripheral 241 may include instructions regarding the retrieval of data in the request to the service manager 280.

Additionally, in an embodiment, a service node/intelligent peripheral 241 may be associated with a local terminating number that is not identified by the service switching point 210 as containing a predefined "trigger". In other words, a customer using customer communications device 201 may dial a predetermined local number to access a service provisioning service without invoking a query to the service control point 230. The call is routed through the switching network to the service node/intelligent peripheral 241, and the service node/intelligent peripheral 241 serves as the client in the computer network that includes the service manager.

Of course, the thread running on the service node/intelligent peripheral 241 may include a timeout module that stops the thread if a response to the CORBA request is not promptly received. In other words, with respect to communications with the service manager 280, the service node/intelligent peripheral 241 may function in the same manner as any other client described herein. However, if needed, the service control point 230 may function as the client in communicating with the service manager 280, similar to the manner in which service control point 230 functions as a client.

Figure 3:
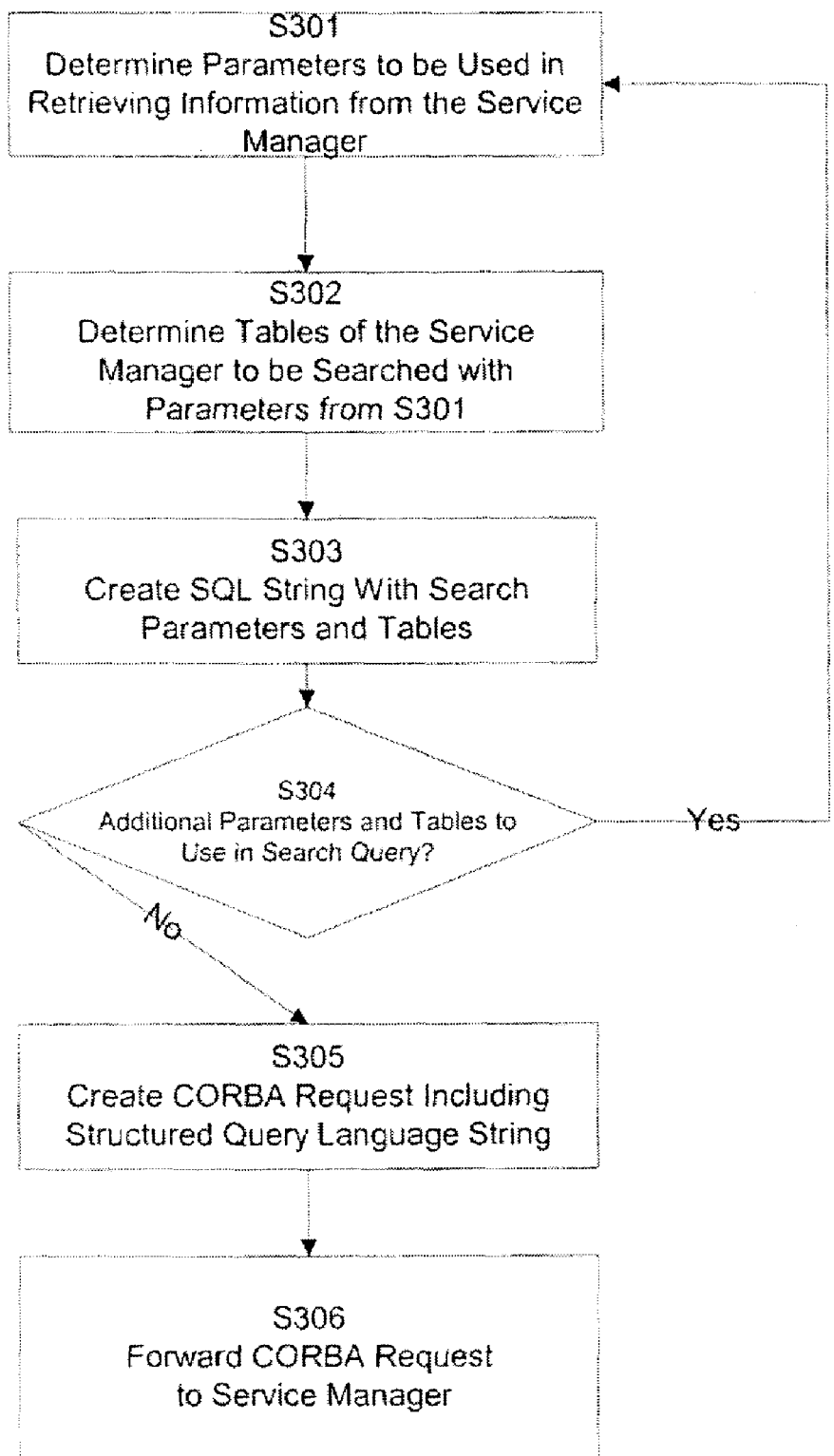
FIG. 3 is a flow diagram showing a method for compiling and forwarding a query via a service manager CORBA request, according to an aspect of the present invention.

FIG. 3 shows an exemplary flow diagram for running a thread that creates and forwards a CORBA request to a service manager according to an aspect of the present invention. Initially, when a client is used to provision or query the service manager, the client determines parameters to be used in retrieving information from the service manager at S301. The parameters to be used may include a particular service, number, name, time or other type of information sought by the client. When the client determines parameters to be used in retrieving information from the service manager, the client determines a table of the service manager to be searched with the parameters at S302.

At S303 the client creates a search query string in SQL. The client then determines whether additional parameters and/or tables are to be used in the string at S304. If the client determines that additional parameters and/or tables are to be used in the string at S304, the process returns to S301. If additional parameters and/or tables are not to be included in the string, a CORBA request including the SQL string is created at S305. Of course, the SQL string includes information of the parameters and tables used in the query. The client forwards the CORBA request to the service manager at S306.

Figure 4:
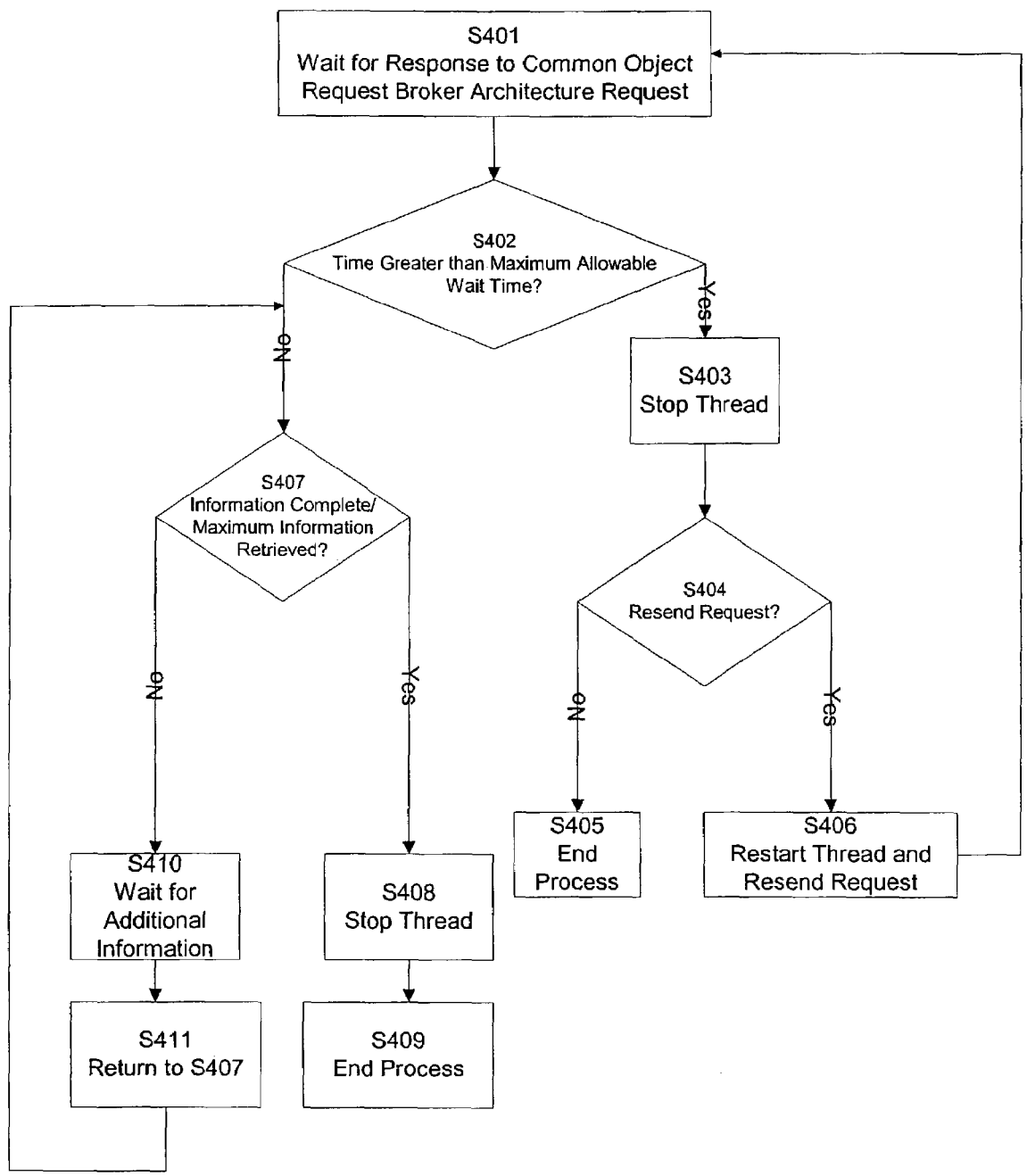
FIG. 4 is a flow diagram showing a method for waiting for, and receiving, a response to a query made via a service manager CORBA request, according to an aspect of the present invention.

FIG. 4 shows a flow diagram for waiting for, and receiving, a response to a CORBA request to a service manager according to an aspect of the present invention. At S401, the client waits for a response to a CORBA request. At S402 a check is made whether the elapsed waiting time is greater than a maximum allowable wait time. If the maximum allowable wait time has been exceeded, the thread is stopped at S403. After the thread is stopped, a decision is made whether to resend the request at S404. If the request is not to be resent, the process ends at S405; otherwise the request is resent at S406 and control returns to S401.

If the time is not greater than a maximum allowable wait time at S402, a determination is made at S407 whether a complete or maximal response has been retrieved in response to the request. If a complete or maximal response has been retrieved at S407, the thread is stopped at S408. Once the thread is stopped at S408, the process ends at S409. If complete information has not been received at S407, the process waits for additional information at S410. When additional information is received at S410, control is returned to S407 at S411.

The following is an example of the type of string that could be passed from a client to a service manager using an SQL string in a CORBA request:

1. "select distinct soname, parentsoname, sokey, sotname, ownername,
2. accgrpname, sogrpname from svcobj s, S01_USER_Data_access t where
3. ((t.user_id='8472485642' or (to_number(t.first_string)<='8472485642' and
4. to_number(t.user_id_range_last_string)>= '8472485642')) and
5. s.soid=t.soid and s.parentsoid=t.parentsoid) union
6. select distinct soname, parentsoname, sokey, sotname, ownername,
7. accgrpname, sogrpname from svcobj s, S01_BDB_TBL u where
8. (u.DN='8472485642' and s.soid=u.soid and s.parentsoid=u.parentsoid) union
9. select distinct soname, parentsoname, sokey, sotname, ownername,
10. accgrpname, sogrpname from svcobj s,
11. s01_SUBSCRIBER_SERV_STAT v where
12. (v.SUBSCRIBER_ID='8472485642' and s.soid=v.soid) order by soname"

Lines 1-12 above are interpreted by a computer processor as a single statement, as indicated by the quotation marks marking the beginning and end of the statement. Of course, the beginning and end of a statement may also be indicated in other ways, as is known in the art of computer programming. The statement begins at line 1 with an instruction to distinctly select multiple memory locations for a comparative search.

The terms "soname, parentsoname, sokey, sotname, ownername, accgrpname, sogrpname" at lines 1 and 2 denote columns of tables in a service manager. For example, "soname" is a service object name that is present in a service manager in columnar form. Similarly, "parentsoname" is a parent service object name that is present in a service manager in columnar form. The parentsoname may be used, for example, by a telecommunications service provider when a corporation subscribes to multiple numbers that may use different services.

The term "sokey" is a service object key denoting a database key associated with, for example, a service control point of an advanced intelligent network. The key provides a link between data at the service manager and data that is stored at a service control point. For example, the key may be returned by an object locator in response to an inquiry for the database associated with a particular service.

The term "sotname" is a service object type name denoting an access level for the client. The service object type name may indicate, for example, a particular level of access granted to a user signed on to a client with a particular logon id.

The terms "accgrpname" and "sogrpname" denote access group names and service object group names. The access group name may indicate an access level of a group to which a user of the client belongs. Additionally, the service object group name may be used to denote a particular service control point pair where data sought in the query resides.

Line 2 also indicates particular tables to be searched at "svcobj s, S01_USER_Data_access t". Conditions in SQL for the query are set beginning with the term "where" in line 2. For example, at lines 3-5 the term "((t.user_id='8472485642' or (to_number(t.first_string)<='8472485642' and to_number(t.user_id_range_last_string)>='8472485642')) and s.soid=t.soid and s.parentsoid=t.parentsoid)"

is a command to convert the "(t.first_string)" to a number, i.e., using the "to_number" command. The converted number is then compared to determine if it is less than the number '8472485642'. Similarly, the statement at line 4 "to_number (t.user_id_range_last_string)>=8472485642" is a command to convert the "user_id_range_last_string" to a number to determine if the converted number is greater than or equal to 8472485642. Accordingly the statement at lines 3 and 4 may be processed as a single logical statement to set the t.user_id as either the number "8472485642" or as the "first_string" converted number if the first_string converted number is less than "8472485642" or as the "user_id_range_last_string" if the "user_id_range_last string" is greater than "8472485642". Line 5 sets the s.soid (s. service object id) to t.soid (the t. service object id). Additionally, line 5 sets the s.parentsoid (s. parent service object id) to t.parentsoid (t. parent service object id).

The term "union" that appears at the end of lines 5 and 8 indicates that each of the statements at lines 1-5, 6-8 and 9-12 are to be read in conjunction. Therefore, the results that will be returned to the client are the results of the three statements jointly.

Lines 6-8 are instructions similar to lines 1-5. The columns "soname", "parentsoname", "sokey", "sotname", "ownername", "accgrpname" and "sogrpname" are to be searched in the tables "svcobj s" and "S01_DBD_TBL u". The dialed number is set as "8472485642" and s.soid is set as u.soid. Furthermore, s.parensoid is set as u.parentsoid.

Lines 9-12 are instructions similar to the instructions as lines 1-5 and 6-8. The columns "soname", "parentsoname", "sokey", "sotname", "ownername", "accgrpname", and "sogrpname" are to be searched in the tables "svcobj s" and "s01_SUBSCRIBER_SERV_STAT v". The subscriber ID is set as "8472485642" and s.soid is set as v.soid. The instruction "order by soname" instructs the service manager to arrange the retrieved data by service object name.

The SQL string is included in a CORBA request that is forwarded to a service manager. The instruction is passed through the CORBA interface to the service manager where the service manager processes the SQL string. The service manager arranges to search the columns of the indicated tables according to the user_id, the DN, and the SUBSCRIBER_ID specified at lines 3, 8 and 12.

According to the invention described herein, a query language string such as the SQL string shown in lines 1-12 can be embedded in a CORBA request presented to a service manager in order to forward data to, or retrieve data from, a storage apparatus managed by the service manager. Additionally, the thread that forwards the request may include a timeout module for stopping the thread if a response to the request is not promptly received. Although the service manager may be provided for a telecommunications service provider's telecommunications network, the use of the apparatus and method of the present invention is not limited to use in a telecommunications network. Rather, the apparatus and method of the present invention may be used in any computer network with any external system utilizing a CORBA interface. Accordingly, in any computer network with a client and an external system utilizing a CORBA interface, the present invention may be used to ensure an efficient use of client resources. In other words, in any computer network with a client and an external system utilizing a CORBA interface, the present invention may be used to ensure either the prompt response to a CORBA request with a query language string or the ending of the thread that sends the CORBA request with the query language string.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for internet and other packet switched network transmissions (e.g., SQL and CORBA) represent examples of the state of the art. Such standards are periodically superseded by faster or more efficient equivalents having essentially the same functions. Accordingly, replacement standards and protocols having the same functions are considered equivalents.

What is claimed is:

1. A method of querying a service manager comprising:
    running a thread comprising a common object request broker architecture (CORBA) request that includes a structured query language (SQL) string, and
    forwarding the request to the service manager;
    iteratively receiving information that matches at least one parameter of the SQL string,
    wherein the thread further comprises a timeout module that waits for a response from the service manager for a predetermined period of time after the request is forwarded, and
    wherein the timeout module stops the waiting when no response is received from the service manager during the predetermined period of time.

2. The method of querying the service manager of claim 1 further comprising:
    caching information that matches the at least one parameter of said SQL string at said service manager, and
    iteratively forwarding the cached information.

3. The method of querying the service manager of claim 1 wherein a size of the information that is received at each iteration is specified by the SQL string.

4. The method of querying the service manager of claim 1, further comprising:
    waiting for a response from the service manager for a predetermined period of time after the request is forwarded, and
    stopping the waiting when no response is received from the service manager during the predetermined period of time.

5. The method of querying the service manager of claim 1, further comprising:
    monitoring a time waiting for a response from the service manager; and
    when the time waiting for the response reaches a predetermined threshold, stopping the thread and no longer waiting for the response.

6. The method of querying the service manager of claim 1, wherein the service manager is a network element that manages a plurality of services on a network.

7. The method of querying the service manager of claim 1, wherein the information that matches the at least one parameter is received via the service manager from a database associated with a service control point in a telecommunications network.

8. An apparatus for querying a service manager in a telecommunications network, the apparatus comprising:
    a processor that runs a thread comprising a common object request broker architecture
    (CORBA) request that includes a structured query language (SQL) string, and
    a memory that stores an operating system for the apparatus,
    wherein the apparatus forwards the request to the service manager,
    wherein the apparatus iteratively receives information that matches at least one parameter of the SQL string,
    wherein the thread further comprises a timeout module that waits for a response from the service manager for a predetermined period of time after the request is forwarded, and
    wherein the timeout module stops the waiting when no response is received from the service manager during the predetermined period of time.

9. The apparatus for querying the service manager in the telecommunications network of claim 8,
    wherein the information that matches the at least one parameter of said SQL string is received via the service manager from a database associated with a service control point in the telecommunications network.

10. The apparatus for querying the service manager in the telecommunications network of claim 8,
    wherein the apparatus monitors a time waiting for a response from the service manager; and
    wherein, when the time waiting for a response reaches a predetermined threshold, the apparatus stops the thread and no longer waits for a response.

11. The apparatus for querying the service manager in the telecommunications network of claim 8,
    wherein information matching a parameter set of said SQL string is cached at said service manager.

12. The apparatus for querying the service manager in the telecommunications network of claim 8,
wherein a size of the information that is received at each iteration is specified by the SQL string.

13. The apparatus for querying the service manager in the telecommunications network of claim 8,
wherein the apparatus waits for a response from the service manager for a predetermined period of time after the CORBA request is forwarded, and
wherein the waiting by the apparatus is stopped when no response is received from the service manager during the predetermined period of time.

14. The apparatus for querying the service manager in the telecommunications network of claim 8, the service manager comprising a network element that manages a plurality of services on the telecommunications network.

15. A system for querying a service manager in a telecommunications network and implemented on at least one processor having a storage, the system comprising:
a client that runs a thread comprising a common object request broker architecture (CORBA) request that includes a structured query language (SQL) string; and
a service manager that receives the request from the client,
wherein the client iteratively receives information that matches at least one parameter of the SQL string,
wherein the thread further comprises a timeout module that waits for a response from the service manager for a predetermined period of time after the request is forwarded, and
wherein the timeout module stops the waiting when no response is received from the service manager during the predetermined period of time.

16. A computer readable storage medium for storing a computer program, recorded on the computer readable storage medium, that queries a service manager, the computer readable storage medium comprising:
a thread running code segment, recorded on the computer readable storage medium, that runs a thread comprising a common object request broker architecture (CORBA) request that includes a structured query language (SQL) string;
a request forwarding code segment, recorded on the computer readable storage medium, that forwards the request to the service manager;
an information receiving code segment, recorded on the computer readable storage medium, that iteratively receives information that matches at least one parameter of the SQL string;
a response waiting code segment, recorded on the computer readable storage medium, that waits for a response from the service manager for a predetermined period of time; and
a wait stopping code segment, recorded on the computer readable storage medium, that stops the waiting when no response is received from the service manager during the predetermined period of time.

* * * * *